United States Patent
Iwasaki et al.

(10) Patent No.: US 7,023,161 B2
(45) Date of Patent: Apr. 4, 2006

(54) POWER REGULATED WINDOW

(75) Inventors: Katsuyuki Iwasaki, Shizuoka (JP);
Yasuyuki Mochizuki, Shizuoka (JP);
Yoshimitsu Maejima, Shizuoka (JP);
Susumu Yamamoto, Shizuoka (JP);
Satoshi Nakagawa, Aichi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/195,787

(22) Filed: Aug. 3, 2005

(65) Prior Publication Data
US 2006/0028162 A1 Feb. 9, 2006

(30) Foreign Application Priority Data
Aug. 4, 2004 (JP) ............................. 2004-227839

(51) Int. Cl.
*G05D 3/00* (2006.01)
(52) U.S. Cl. .................... 318/466; 318/445; 318/286
(58) Field of Classification Search ............ 318/466, 318/445, 286
See application file for complete search history.

(56) References Cited

U.S. PATENT DOCUMENTS

| | | | | |
|---|---|---|---|---|
| 4,328,451 A | * | 5/1982 | Barge | 318/596 |
| 6,169,379 B1 | * | 1/2001 | Zhang et al. | 318/280 |
| 6,917,169 B1 | * | 7/2005 | Nagasawa et al. | 318/280 |
| 6,936,988 B1 | * | 8/2005 | Nakazawa et al. | 318/469 |
| 6,940,246 B1 | * | 9/2005 | Mochizuki et al. | 318/469 |
| 2002/0024308 A1 | * | 2/2002 | Kato et al. | 318/445 |
| 2002/0036475 A1 | * | 3/2002 | Okamoto | 318/445 |
| 2004/0222759 A1 | * | 11/2004 | Ohshima | 318/286 |
| 2004/0252423 A1 | * | 12/2004 | Boren | 361/23 |

FOREIGN PATENT DOCUMENTS

JP 2003-307076 10/2003

* cited by examiner

*Primary Examiner*—Rita Leykin
(74) *Attorney, Agent, or Firm*—Armstrong, Kratz, Quintos, Hanson & Brooks, LLP (57) ABSTRACT

The present invention is to provide a power regulated window having a window glass to be closed intentionally when some foreign body is pinched by the window glass for security reasons. When a close signal is output to a semiconductor switching element from window regulator switches, the window glass is closed. When some foreign body such as arm or fingers is pinched by the window glass, a load current of a motor becomes abnormal and the motor rotates reversely to open the window glass in order not to damage the foreign body. Besides this protective function, when the foreign body is pinched by the window glass and a prohibit signal to invalidate the reverse rotation is output, a reversing controller is stopped and the window glass is closed continuously by a bypass switching element.

4 Claims, 6 Drawing Sheets

POWER REGULATED WINDOW

BACKGROUND OF THE INVENTION

1. Field of the Invention

The present invention relates to a power regulated window, more specifically to a power regulated window having a window glass which is opened by a motor when a foreign body is pinched by the window glass.

2. Description of the Related Art

Figure 6:
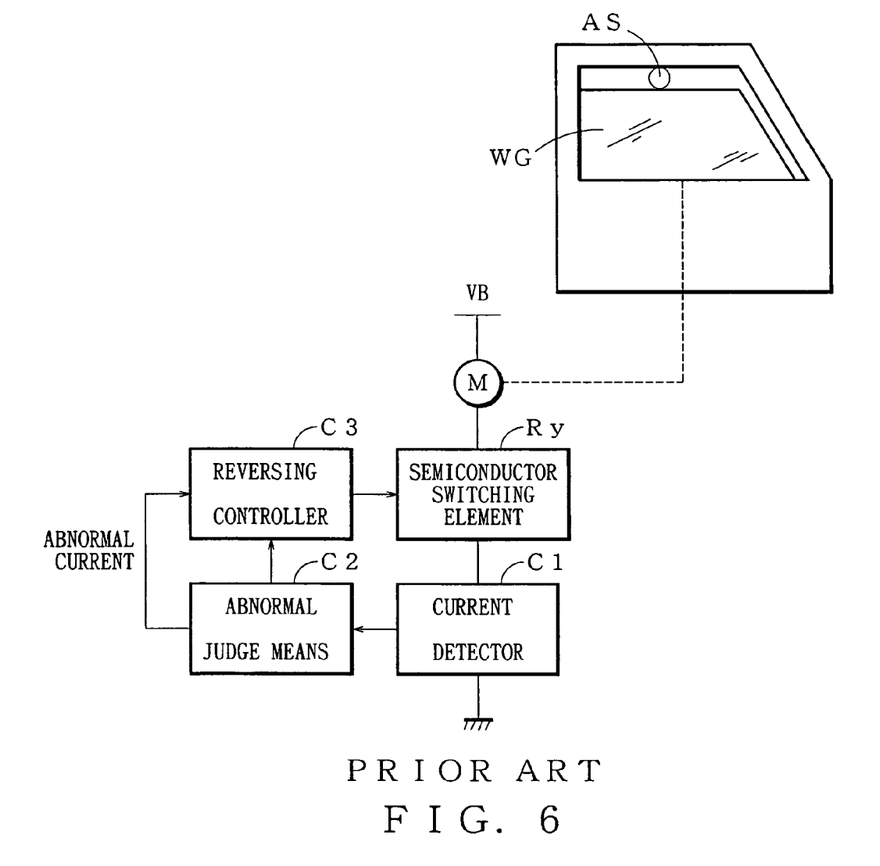
FIG. 6 is a block diagram showing a basic structure of a conventional power regulated window.

The window glass is opened and closed by open and close signals from window regulator switches of the window glass. It is known a power regulated window having a window glass which is opened by a motor when a foreign body is pinched by the window glass. FIG. 6 shows a block diagram of the conventional power regulated window.

As shown in FIG. 6, a motor M rotates to regulate a window glass WG of a vehicle responding to open and close signals. The apparatus includes a semiconductor switching element Ry to control an electric power supply VB to the motor M, a current detector C1 to detect a load current flowing the motor M during the operation of the window glass WG, an abnormal judge means C2 to monitor whether or not the detected load current is abnormal, and a reversing controller C3 to output an open signal to the semiconductor switching element Ry to reverse the rotation of the motor M.

In this conventional apparatus, when the window glass WG is closing by means of the control of the semiconductor switching element Ry responding to the close signal from the window regulator switches, if a foreign body AS such as an arm or fingers is pinched by the window glass WG, the load current flowing the motor M becomes abnormal and is determined that some foreign body is pinched by the window glass WG so that the open signal to reverse the rotation of the motor M is output to the semiconductor switching element Ry and the window glass WG is opened to avoid a damage to the foreign body AS.

The conventional power regulated window described above is disclosed in JP, 2003-307076, A.

The conventional apparatus provides the window glass WG to be opened by the reverse rotation of the motor M when some foreign body AS is pinched by the window glass WG. Meanwhile, there is a request for a function that the window glass WG continues to close intentionally without reversing the rotation of the motor M even when the foreign body AS is pinched by the window glass WG for security reasons. In order to improve the response speed of the motor M, the semiconductor switching element is usually utilized. However, since the semiconductor switching element is apt to heat, it is preferable to close continuously the window glass WG by controlling the heat.

SUMMARY OF THE INVENTION

An object of the present invention is to provide a power regulated window having a window glass to be closed continuously and intentionally for security reasons when a foreign body is pinched by the window glass and preferably to provide the power regulated window without an excessive heat of a semiconductor switching element.

Figure 1:
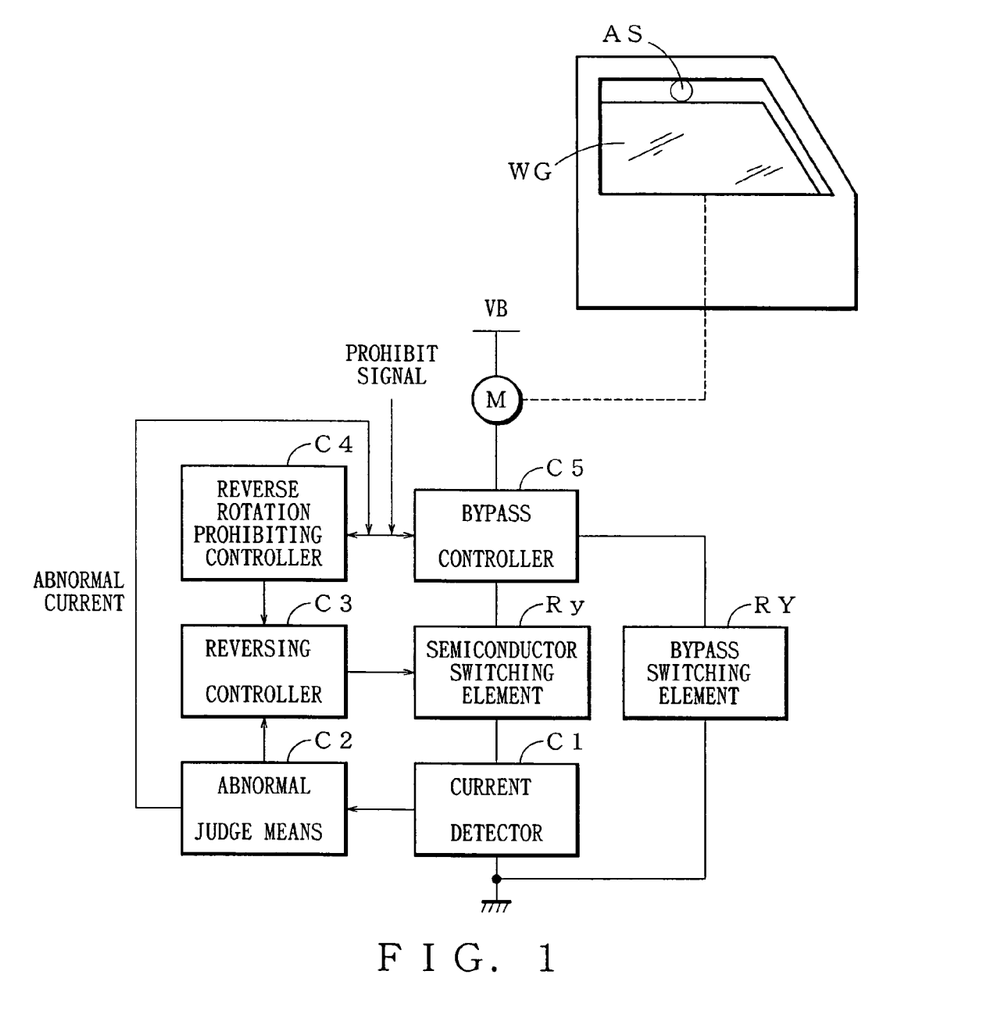
FIG. 1 is a block diagram showing a basic structure of a power regulated window of the present invention.

According to a first aspect of the invention, as shown in FIG. 1, a power regulated window includes a semiconductor switching element to control an electric power supply to a motor to regulate a window glass responding to open and close signals, a current detector to detect a load current of the motor when the window glass is closing, an abnormal judge means to monitor whether or not the detected load current is abnormal, and a reversing controller to output the open signal to the semiconductor switching element to reverse the rotation of the motor when the load current is abnormal, and further includes a reverse rotation prohibiting controller for not allowing the reverse rotation of the motor when it receives a prohibit signal by stopping the output of the open signal of the reversing controller.

Thereby, when a foreign body is pinched by the window glass during closing the window glass, the load current of the motor becomes abnormal and the motor rotates in the reverse direction to open the window glass to avoid a damage to the foreign body. Besides the pinch protection, when the prohibit signal is received, the output of the open signal is stopped and the window glass is closed continuously and intentionally when the foreign body is pinched by the window glass.

According to a second aspect of the invention, the power regulated window further includes a bypass controller to output a bypass signal when it receives the prohibit signal for not allowing the reverse rotation of the motor, and a bypass switching element which supplies an electric power to the motor to rotate in the direction of closing the window, which has higher rated capacity than the semiconductor switching element.

Thereby, when the bypass controller outputs the bypass signal, the current does not flow to the semiconductor switching element but flows to the bypass switching element to close the window glass by the motor.

According to a third aspect of the invention, the power regulated window includes the bypass controller to output the bypass signal when the prohibit signal is received and the load current is abnormal, and the bypass switching element to supply the electric power to the motor to close the window glass responding to the bypass signal, which has higher rated capacity than the semiconductor switching element.

Thereby, when the load current is normal, the current continues to flow to the semiconductor switching element, but when the bypass controller receives the prohibit signal and the load current is abnormal, the current flows through the bypass switching element, instead of the semiconductor switching element, to the motor to close the window glass.

According to a fourth aspect of the invention, the power regulated window further includes the bypass controller to output the bypass signal when the prohibit signal is received, and the bypass switching element to supply the electric power to the motor to close the window glass responding to the bypass signal.

Thereby, when the bypass controller receives the prohibit signal, the current does not flow to the semiconductor switching element but flows to the motor through the bypass switching element to close the window glass.

DETAILED DESCRIPTION OF THE PREFERRED EMBODIMENTS

Figure 2:
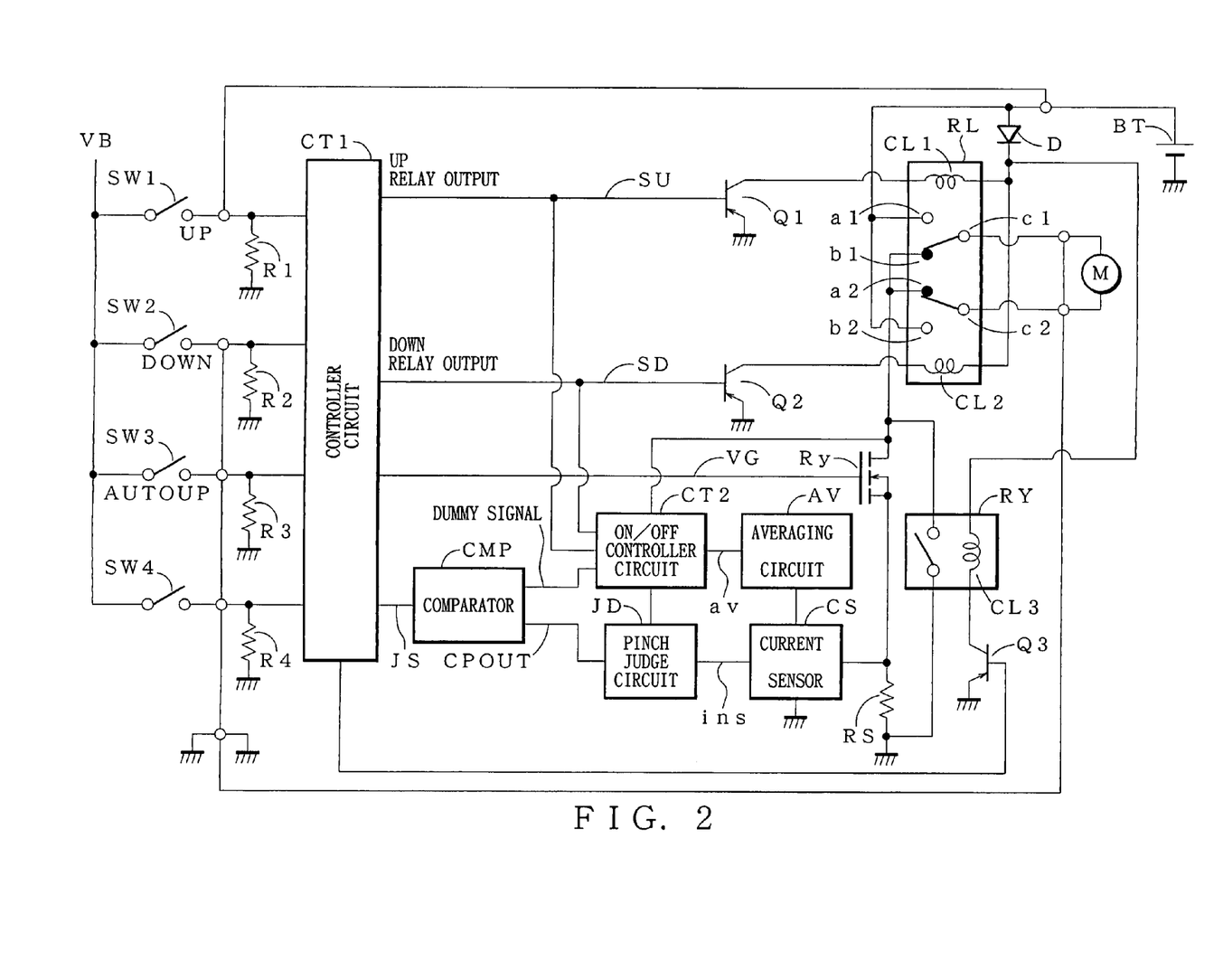
FIG. 2 is a block diagram showing a power regulated window according to a first embodiment of the present invention.
Figure 3:
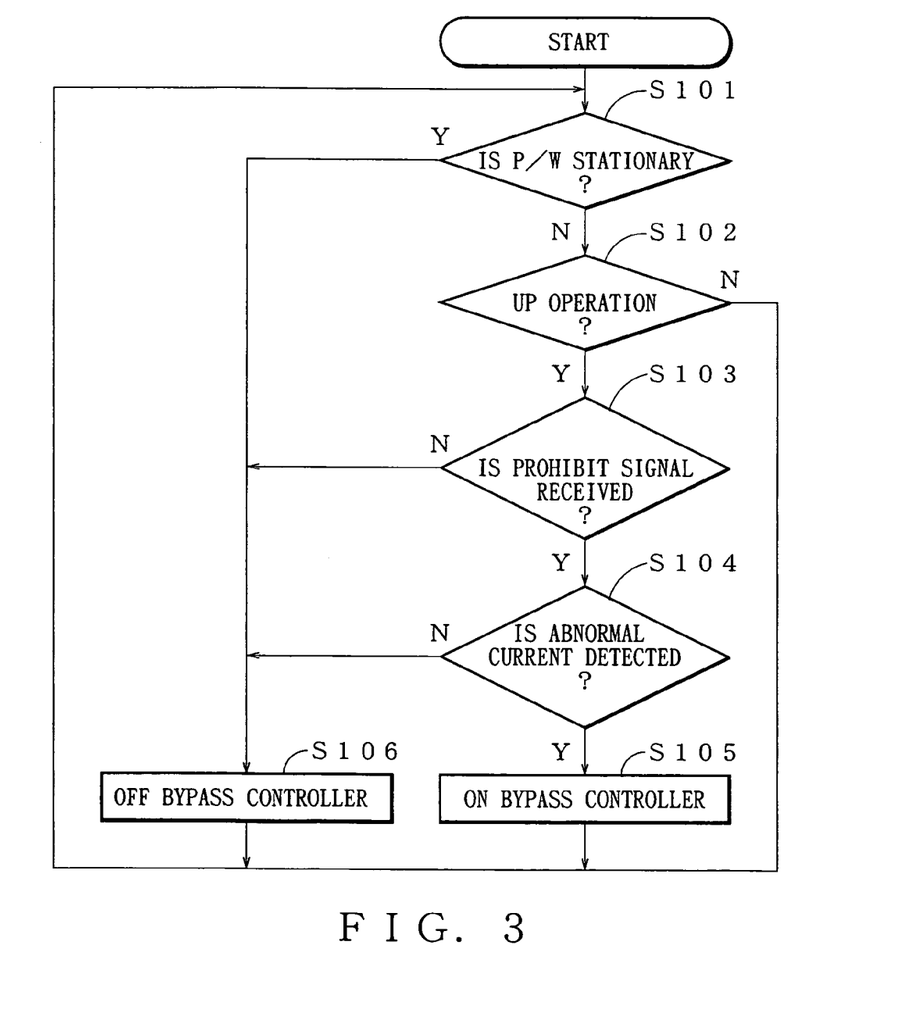
FIG. 3 is a flow chart showing a processing order of the power regulated window according to the first embodiment of the present invention.
Figure 4A:
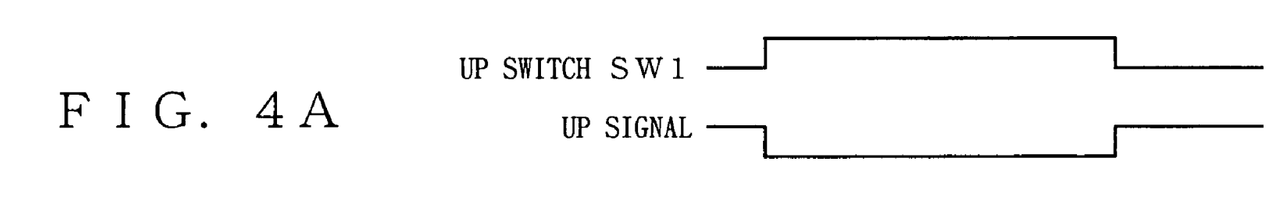
FIG. 4A is a time chart of the processing order of FIG. 3.
Figure 4B:
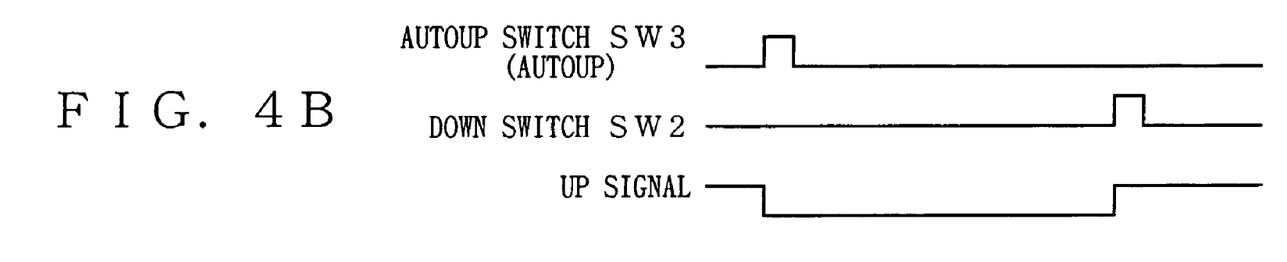
FIG. 4B is a time chart of the processing order of FIG. 3.
Figure 4C:
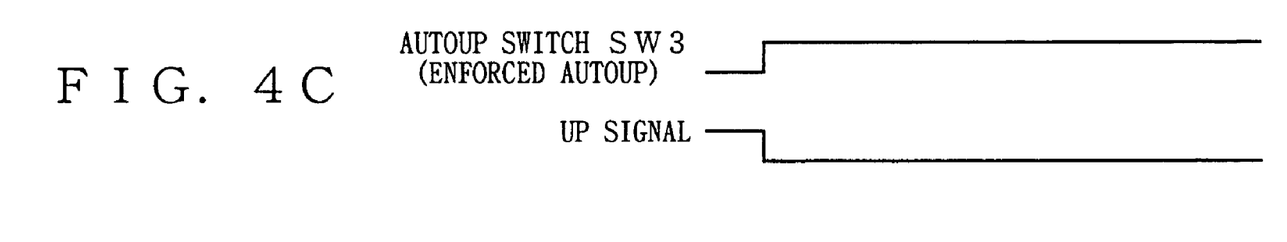
FIG. 4C is a time chart of the processing order of FIG. 3.
Figure 5:
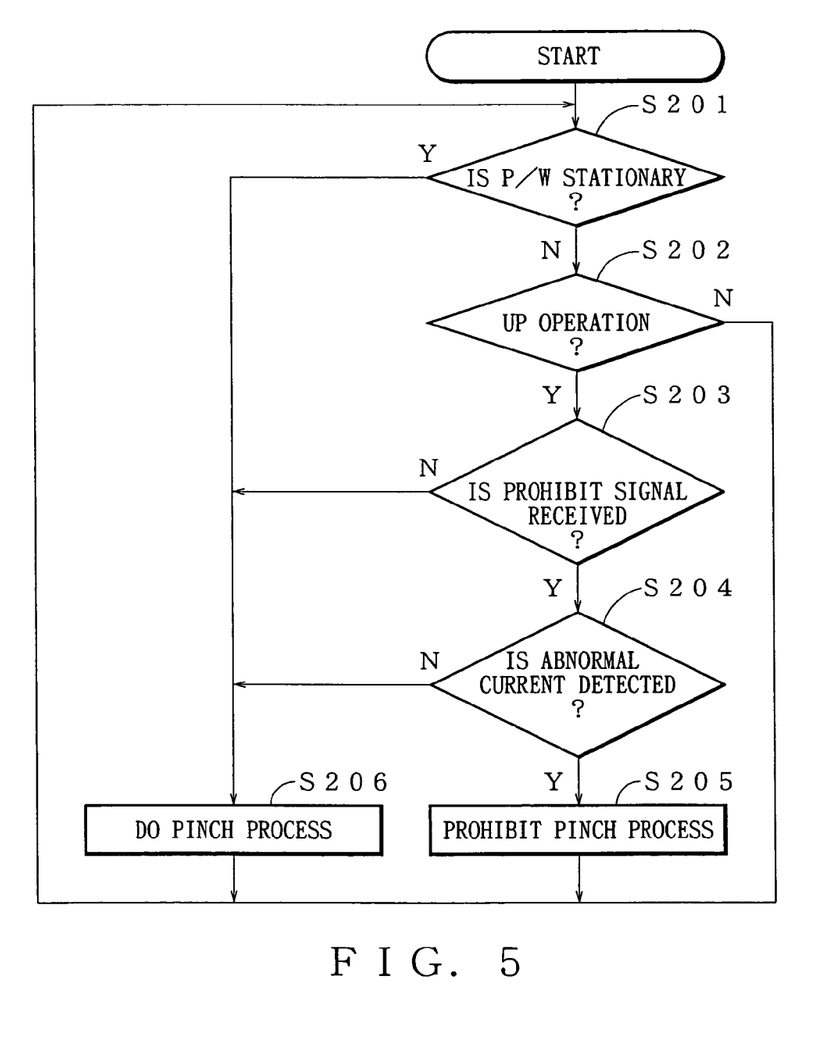
FIG. 5 is a flow chart showing a processing order of a power regulated window according to a second embodiment of the present invention.

Embodiments of the present invention are explained by referring to drawings in which FIGS. 2 to 4 are related to a first embodiment and FIG. 5 is related to a second-embodiment.

FIG. 2 is a block diagram showing a power regulated window of the first embodiment according to the present invention. FIG. 3 is a flow chart showing a processing order of the power regulated window. FIGS. 4A to 4C each are a time chart according with the processing order of FIG. 3.

As shown in FIG. 2, the power regulated window includes four switches SW1, SW2, SW3 and SW4 placed on an upper face of an armrest in a vehicle. The switch SW1 (UP) is for closing a window glass, the switch SW2 (DOWN) for opening the window glass, the switch SW3 (AUTOUP) for automatically closing the window glass (the continued connection of the switch SW3 is functionally same as the connected state of the switch SW4), and the switch SW4 is a reverse rotation prohibiting switch to prohibit the reverse rotation of the motor. The power regulated window includes an controller circuit CT1 which inputs an UP signal SU and a DOWN signal SD to close and open the window glass by means of a motor M respectively through the operation of the switches SW1 to SW3. The controller circuit CT1 also outputs an ON/OFF control signal to a semiconductor switching element Ry in order to control a current flowing the motor M in a limited range and control a torque of the motor M when a foreign body is pinched by the window glass. It also outputs the DOWN signal SD when a pinch judge signal JS is received. The apparatus includes a relay RL to switch a rotation direction of the motor M by changing a current direction, and a bypass switching element RY to rotate the motor M in place of the semiconductor switching element Ry, which is connected in parallel with the semiconductor switching element Ry (for example, formed with FET). The power regulated window includes transistors Q1 and Q2 to drive the relay RL based on the UP signal SU and DOWN signal SD, the semiconductor switching element Ry to control the torque of the motor, a shunt resistance RS to transform the motor current flowing the semiconductor switching element Ry to a voltage and detect the voltage, which is connected between a source and a ground of the semiconductor switching element Ry, and a current sensor CS to input an instant motor current value ins after detecting a voltage of both ends of the shunt resistance RS. The power regulated window includes an averaging circuit AV to detect the voltage at the both ends of the shunt resistance RS, smooth the voltage by a smoothing circuit with a given time constant, and output an average value av of the motor current, and a pinch judge circuit JD to compare the average value av and the instant value ins, detect the foreign body between the window glass and a window frame when the instant value ins is greater than the average value av, and output an abnormal output CPOUT. The apparatus includes an ON/OFF controller circuit CT2 to drive the ON/OFF operation of the semiconductor switching element Ry when the foreign body is pinched between the window glass and the window frame, control the motor current, and control the torque of the motor M. The apparatus includes a comparator to count a DUMMY signal of ON/OFF signal output from the ON/OFF controller circuit CT2 responding to the ON/OFF operation of the semiconductor switching element Ry, compare the counted value with a given pinch judge number, and output the pinch judge signal JS to the control circuit CT1 based on the comparison.

Pull-down resistances R1 to R4 are connected between the switches SW1 to SW4 and the controller circuit CT1 to output L levels to the controller circuit CT1 when the switches are OFF, and ends of the resistances are connected to the ground. Both ends of exciting coils CL1 and CL2 in the relay RL are connected to a common cathode of a diode D which anode is connected to a positive terminal of a battery BT for driving the motor, and the other ends thereof are connected to collectors of the transistors Q1 and Q2 respectively, which emitters are connected to the ground. The motor M is connected to a common contact c1 and common contact c2 in the relay RL. An opening contact a1 for the common contact c1 and an opening contact a2 for the common contact c2 are connected to the positive terminal of the battery BT. A closing contact b1 for the common contact c1 and a closing contact b2 for the common contact c2 are connected to a drain of the semiconductor switching element Ry for controlling the motor current.

In this arrangement, when the UP switch SW1 and the transistor Q1 are ON, and the DOWN switch SW2 and the transistor Q2 are OFF, the exciting coil CL1 is excited so that the opening contact a1 is closed. As a result, a current from the battery BT flows the opening contact a1 through the closing contact b2 to the drain of the semiconductor switching element Ry so that the motor M rotates to move up the window, namely to close.

When the UP switch SW1 and the transistor Q1 are OFF, and the DOWN switch SW2 and the transistor Q2 are ON, the exciting coil CL2 is excited so that the opening contact a2 is closed. As a result, the current from the battery BT flows the opening contact a2 through the closing contact b1 to the drain of the semiconductor switching element Ry so that the motor M rotates to move down the window, namely to open. In this case, the direction of the current flowing the motor M is opposite to the case of closing the window glass. The same operation is also accomplished by means of the automatic closing switch SW3.

At the fully closing or fully opening operation of the window glass, the semiconductor switching element Ry is ON due to that a gate voltage VG of [H] from the controller circuit CT1 is output to the gate of the semiconductor switching element Ry.

At the pinch process, the average value av follows to the instant value ins keeping a given threshold value unless the motor current increases rapidly due to an excessive load to the motor M when the foreign body is pinched by the window glass.

As a result, the instant value ins is always lower than the average value av to the extent of the threshold value. Then, the pinch judge circuit JD does not output the abnormal output CPOUT.

However, when fingers are pinched by the window glass when fully closing the window glass and the torque of the motor changes and an excess current flows into the motor M, the instant value ins varies faster than the time constant of the averaging circuit AV and is output to the pinch judge circuit JD instead of the slowly changing average value av. Thereby, the pinch judge circuit JD outputs CPOUT to the comparator CMP and ON/OFF controller circuit CT2. The ON/OFF controller circuit CT2 outputs the DUMMY signals of ON/OFF signals of H/L while the CPOUT is output to the ON/OFF controller circuit CT2.

The DUMMY signals are counted when the output DUMMY signals reach to the level of H. The comparator CMP compares the counted result of the DUMMY signals with the a predetermined judging number and makes a judge to be pinched when the DUMMY signals are counted to the judging number. When the pinch is judged, the relay RL is controlled and the motor M rotates in reverse to drive the DOWN operation of the window.

The basic operation and pinch process described above are well known and disclosed in JP, 2003-307076, A. Besides the basic operation and pinch process, a special operation by the controller circuit CT1 of a first embodiment of the present invention is described by referring to FIGS. 3 and 4.

At S101, if the power regulated window is stationary (Y at S101), go to directly S106 and the bypass controller is OFF. Since the transistor Q2 is OFF, the bypass switching element RY is also OFF. If the power regulated window is in operation (N at S101), go to S102 to judge UP or DOWN operation.

At S102, when the operation is DOWN (N at S102), return to S101 without any execution, because any processing is necessary in the embodiment of the present invention. If the operation is UP at S102, go to S103 to judge the existence of prohibit signal. The prohibit signal is a signal not to permit the motor to rotate in the reverse direction (to open the window glass) to avoid the pinch of the foreign body when the current sensor detects the abnormal load current. For example, the switch SW4 outputs the signal at ON.

The UP operation of the window glass is performed when the UP signal is output (for example L level in this case) as shown in FIGS. 4A to 4C. The UP signals are generated when the UP switch SW1 is ON and until OFF as shown in FIG. 4A, when the AUTOUP switch SW3 is short ON and until the DOWN switch SW2 ON as shown in FIG. 4B, or when the AUTOUT switch SW3 is ON as shown in FIG. 4C. Namely, when the AUTOUP switch SW3 remains ON (long ON), the forced UP operation, that is, the reverse motion is prohibited.

At S103, if the prohibit signal is not obtained (N at S103) go to S106 and the bypass controller is OFF. If the prohibit signal is obtained at S103 (Y at S103), go to S104 and the abnormal current is detected.

At S104, when the current detected by the current sensor CS is abnormal (Y at S104) and the pinch judge signal JS is output from the comparator CMP, go to S105, otherwise (N at S104) go to S106 and the bypass controller becomes OFF.

At S105, the bypass controller ON is made so that the transistor Q1 is ON and the transistor Q2 is OFF. Most of the current flows into the bypass switching element RY to rotate the motor M in the direction of the UP operation of the window glass. Such operation is repeated as far as S101 is N, S102 is Y, S103 is Y and S104 is Y. S105 corresponds to the bypass controller in claims.

According to the first embodiment, the operation of the reverse rotation prohibiting switch SW4 does not flow the current to the semiconductor switching element Ry but flows the current to the bypass switching element RY to close the window glass by the motor. Thereby, the window glass can be closed continuously without abnormal heating of the conventional semiconductor switching element Ry.

It is preferably changed to the bypass switching element RY only when the reverse rotation prohibiting switch SW4 is operated and the load current is abnormal.

For security reasons, it is necessary to close the window glass continuously even when the foreign body is pinched by the window glass. In this case, the bypass controller ON of S105 is simply replaced by a reverse rotation prohibiting process, that is, to prohibit the pinch process as described below.

FIG. 5 is a flow chart showing a processing of a power regulated window by means of the control circuit CT1 according to a second embodiment of the present invention. A hardware of the second embodiment may be same as that in FIG. 2 and further the bypass switching element RY may be removed from FIG. 2.

At S201, if the power regulated window is stationary (Y at S201), go to directly S206 and the pinch process is valid. If the power regulated window is in operation (N at S201), go to S202 to judge the operation UP or DOWN.

At S202, when the operation is DOWN (N at S202), return to S201 without any execution, because any processes are necessary in the embodiment of the present invention. If the operation is UP at S202 (Y at S202), go to S203 to judge the existence of prohibit signal.

At S203, if the prohibit signal is not obtained (N at S203) go to S206 and the pinch process is valid. If the prohibit signal is obtained at S203 (Y at S203), go to S204 and an abnormal current is detected.

At S204, when the current detected by the current sensor CS is abnormal (Y at S204) and the pinch judge signal JS is output from the comparator CMP, go to S205, otherwise (N at S204) go to S206 and the pinch process becomes valid. The abnormal current level to decide is same as that of the power regulated window in FIG. 1.

At S205, the pinch process becomes invalid, that is, the reverse rotation prohibiting process is executed. The reverse rotation prohibiting process controls the semiconductor switching element Ry and invalids the ON/OFF controller circuit CT2, the averaging circuit AV, the current sensor CS, the pinch judge circuit JD and the comparator CMP. Such operation is repeated as far as S201 is N, S202 is Y, S203 is Y and S204 is Y. S205 corresponds to the reverse rotation prohibiting controller in claims.

Thereby, according to the second embodiment, the simple controller can close the window glass intentionally when the foreign body is pinched by the window glass. However a long and forced operation to close the window glass by the motor M may damage the motor M and heat the semiconductor switching element Ry so that it is necessary to stop the close operation at a suitable period.

As a modification of FIG. 2, when the prohibit signal is output by the reverse rotation prohibiting switch SW4, the motor may be rotated to close the window glass through the bypass switching element RY. Thereby, when the semiconductor switching element Ry in use breaks down, it is possible to close the window glass.

According to the embodiment of the present invention, for security reason, it is possible to provide the power regulated window to be closed intentionally even when some foreign body is pinched by the window.

The power regulated window of the present invention is especially adapted to vehicles but also to window glasses utilized in buildings. The circuit structure shown in FIG. 2 can be modified.

What is claimed is:

1. A power regulated window comprising:
   a semiconductor switching element to control an electric power supply to a motor to regulate a window glass responding to open and close signals;

a current detector to detect a load current of the motor when the window glass is closing;

an abnormal judge means to monitor whether or not the detected load current is abnormal;

a reversing controller to output the open signal to the semiconductor switching element to reverse the rotation of the motor when the detected load current is abnormal, and further comprising a reverse rotation prohibiting controller which prohibits the reverse rotation of the motor when it receives a prohibit signal for not allowing the reverse rotation of the motor by stopping the output of the open signal of the reversing controller.

2. The power regulated window as claimed in claim 1, further comprising a bypass controller to output a bypass signal when it receives the prohibit signal, and a bypass switching element which supplies the electric power to the motor to rotate in the direction of closing the window.

3. The power regulated window as claimed in claim 1, wherein said bypass controller outputs the bypass signal when the prohibit signal is received and the detected load current is abnormal, and the bypass switching element supplies the electric power to the motor to close the window glass responding to the bypass signal.

4. A power regulated window comprising:

a semiconductor switching element to control an electric power supply to a motor to regulate a window glass responding to open and close signals;

a current detector to detect a load current of the motor when the window glass is closing;

an abnormal judge means to monitor whether or not the detected load current is abnormal;

a reversing controller to output the open signal to the semiconductor switching element to reverse the rotation of the motor when the load current is abnormal, and further comprising a bypass controller to output a bypass signal when it receives a prohibit signal, and a bypass switching element which supplies the electric power to the motor to rotate in the direction of closing the window responding to the bypass signal.

* * * * *